US009049449B2

(12) United States Patent
Wang et al.

(10) Patent No.: US 9,049,449 B2
(45) Date of Patent: Jun. 2, 2015

(54) CODING OF FRAME NUMBER IN SCALABLE VIDEO CODING

(75) Inventors: Ye-Kui Wang, Tampere (FI); Miska Hannuksela, Ruutana (FI)

(73) Assignee: Nokia Corporation, Espoo (FI)

( * ) Notice: Subject to any disclaimer, the term of this patent is extended or adjusted under 35 U.S.C. 154(b) by 2349 days.

(21) Appl. No.: 11/105,421

(22) Filed: Apr. 13, 2005

(65) Prior Publication Data

US 2006/0233242 A1    Oct. 19, 2006

(51) Int. Cl.
*H04N 7/12* (2006.01)
*H04N 19/36* (2014.01)
*H04N 19/70* (2014.01)
*H04N 19/33* (2014.01)
*H04N 19/423* (2014.01)
*H04N 19/573* (2014.01)
*H04N 19/34* (2014.01)

(52) U.S. Cl.
CPC ............... *H04N 19/36* (2014.11); *H04N 19/70* (2014.11); *H04N 19/33* (2014.11); *H04N 19/423* (2014.11); *H04N 19/573* (2014.11); *H04N 19/34* (2014.11)

(58) Field of Classification Search
CPC ....... H04N 19/36; H04N 19/70; H04N 19/33; H04N 19/423; H04N 19/573; H04N 19/34
USPC .............. 375/240, 240.01, 240.12; 358/261.2
See application file for complete search history.

(56) References Cited

U.S. PATENT DOCUMENTS

| | | | |
|---|---|---|---|
| 6,697,426 | B1 * | 2/2004 | Van Der Schaar et al. ........................ 375/240.01 |
| 2001/0040700 | A1 * | 11/2001 | Hannuksela et al. ...... 358/261.2 |
| 2003/0007557 | A1 | 1/2003 | Katata et al. |

FOREIGN PATENT DOCUMENTS

| | | |
|---|---|---|
| WO | WO03063505 A1 | 7/2003 |
| WO | WO 03094496 | 11/2003 |

OTHER PUBLICATIONS

Joint Scalable Video Model JSVM 1, Heiko Schwarz and Mathias Wien, Jan. 2005, pp. 1-38.
Scalable Video Coding—Working Draft 1, Heiko Schwarz and Mathias Wien, Jan. 2005, pp. 1-81.
Working Draft 1.0 of 14496-10:200x/MAD1 Scalable Video Coding, Heiko Schwarz and Mathias Wien, Jan. 2005, pp. 81.
European search report for European Application No. 06744492.7, dated Jun. 28, 2011.
van der Schaar, Mihaela et al., "An all FGS solution for hybrid Temporal-SNR scalability", ITU Study Group 16—Video Coding Experts Group—ISO/IEC MPEG & ITU-T VCEG(ISO/IEC JTC1/SC29/WG11 and ITU-T SG16 06), Nov. 29, 1999.

(Continued)

*Primary Examiner* — Allen Wong
(74) *Attorney, Agent, or Firm* — Alston & Bird LLP

(57) ABSTRACT

A method of encoding scalable video data having multiple layers where each layer in the multiple layers is associated with at least one other layer includes identifying one or more layers using a first identifier where the first identifier indicates decoding dependency, and identifying reference pictures within the identified one or more layers using a second identifier. The coding of the second identifier for pictures in a first layer is independent of pictures in a second enhancement layer. As such, for all pictures with a certain value of DependencyID, the syntax element frame_num is coded independently of other pictures with different values of DependencyID. Within all pictures with a pre-determined value of DependencyID, a default frame_num coding method is used.

24 Claims, 3 Drawing Sheets

(56) References Cited

OTHER PUBLICATIONS

Li, Weiping, "Syntax and Semantics to Enable FGS Temporal Scalability", ITU Study Group 16—Video Coding Experts Group—ISO/IEC MPEG & ITU-T VCEG(ISO/IEC JTC1/SC29/WG11 and ITU-T SG16 06), Mar. 14, 2000.

Tian, Dong et al, "Sub-Sequence Video Coding for Improved Temporal Scalability", 3rd General Partnership Project (3GPP), Mobile Competence Centre; 650, Route Des Lucioles; F-06921 Sophia-Antipolis Cedex; France, vol. SA WG4, No. Malaga, Spain, Feb. 19, 2004.

Wang, Ye-Kui, "On SVC high-level syntax", ITU Study Group 16—Video Coding Experts Group—ISO/IEC MPEG & ITU-T VCEG(ISO/IEC JTC1/SC29/WG11 and ITU-T SG16 06), Apr. 14, 2005.

Office Action for Japanese Patent Application No. 2008-505977, dated Aug. 29, 2011.

English translation of Office Action for Japanese Patent Application No. 2008-505977, dated Aug. 29, 2011.

International Search Report for PCT Application No. PCT/IB2006/000864 dated Sep. 9, 2006.

Office Action for European Application No. 06 744 492.7 dated Sep. 11, 2012.

Richardson, I. G., H.264/AVC, *Frame and Picture Management* (dated 2004) [online] [retrieved May 29, 2007]. Retrieved from the Internet: <URL: http://www.rgu.ac.uk/files/avc_picmanagement_draft1.pdf>, 7 pages.

Stockhammer, T. et al., *H.264/AVC in Wireless Environments*, IEEE Transactions on Circuits and Systems for Video Technology, vol. 13, No. 7, Jul. 2003, pp. 657-673.

Written Opinion from International Application No. PCT/IB2006/000864 dated Sep. 5, 2006.

Identifier—Wikipedia, the free encyclopedia [online] [Retrieved Feb. 22, 2011]. Retrieved from the Internet: http://en.wikipedia.org/wiki/Identifier (dated Feb. 22, 2011) 3 pages.

\* cited by examiner

CODING OF FRAME NUMBER IN SCALABLE VIDEO CODING

CROSS REFERENCE TO RELATED APPLICATIONS

None.

BACKGROUND OF THE INVENTION

1. Field of the Invention

The present invention relates generally to scalable video coding methods and systems. More specifically, the present invention relates to techniques for coding of frame number in scalable video coding.

2. Description of the Related Art

This section is intended to provide a background or context. The description herein may include concepts that could be pursued, but are not necessarily ones that have been previously conceived or pursued. Therefore, unless otherwise indicated herein, what is described in this section is not prior art to the claims in this application and is not admitted to be prior art by inclusion in this section.

There are a number of video coding standards including ITU-T H.261, ISO/IEC MPEG-1 Visual, ITU-T H.262 or ISO/IEC MPEG-2 Visual, ITU-T H.263, ISO/IEC MPEG-4 Visual and ITU-T H.264 or ISO/IEC MPEG-4 AVC. H.264/AVC is the work output of a Joint Video Team (JVT) of ITU-T Video Coding Experts Group (VCEG) and ISO/IEC MPEG.

In addition, there are efforts working towards new video coding standards. One is the development of scalable video coding (SVC) standard in MPEG. This standard will become an amendment to H.264/AVC. The second effort is the development of China video coding standards organized by the China Audio Visual coding Standard Work Group (AVS). AVS finalized its first video coding specification, AVS 1.0 targeted for SDTV and HDTV applications, in February 2004. Since then the focus has moved to mobile video services.

Many of the available video coding standards utilize motion compensation, i.e. predictive coding, to remove temporal redundancy between video signals for high coding efficiency. In motion compensation, one or more previously decoded pictures are used as reference pictures of the current picture being encoded or decoded. When encoding one block of pixels of the current picture (the current block), a reference block from the reference picture is searched such that the difference signal between the current block and the reference block requires a minimum number of bits to represent. Encoding the displacement between the current block and the reference block may also be considered in searching the reference block. Further, the distortion of the reconstructed block may also be considered in searching the reference block.

In a coded video bit stream, some pictures may be used as reference pictures when encoding of other pictures, while some may never be used as reference pictures. A picture that is not to be used as a reference picture is called a non-reference picture. The encoder should then signal whether a picture is a reference picture to a decoder such that the decoder does not need to store the picture for motion compensation reference.

In H.264/AVC, each predictive picture may have multiple reference pictures. These reference pictures are ordered in two reference picture lists, called RefPicList0 and RefPicList1. Each reference picture list has an initial order, and the order may be changed by the reference picture list reordering process. For example, assume that the initial order of RefPicList0 is r0, r1, r2, . . . , rm, which are coded using variable length codes. Code 0 represents r0, code 1 represents r1, and so on. If the encoder knows that r1 is used more frequently than r0, then it can reorder the list by swapping r0 and r1 such that code 1 represents r0, code 0 represents r1. Since code 0 is shorter than code 1 in code length, improved coding efficiency is achieved. The reference picture list reordering process must be signaled in the bit stream so that the decoder can derive the correct reference picture for each reference picture list order. The reference picture list reordering process for H.264/AVC is specified in subclause 8.2.4.3 of the standard specification.

Initially, each reference picture should be stored in the post-decoder buffer or decoded picture buffer and marked as "used for reference". However, when a reference picture is not used for reference anymore, it should be marked as "unused for reference." Both the reference picture list reordering process and the reference picture marking process (i.e. marking of a reference picture as "unused for reference") are done by a reference picture management process using memory management control operation (MMCO) signaling. The reference picture marking process for H.264/AVC is specified in subclause 8.2.5 of the standard specification.

In both processes, the target reference picture, to be mapped to a new order in the reference picture list or marked as "unused for reference," is identified by a syntax element according to which the identifier PicNum can be derived. The PicNum is derived from the syntax element frame_num, which is coded in the slice header, and is used to identify reference pictures that are used for inter prediction reference. Basically, the frame_num increases by 1 relative to the value of the frame_num in the previous reference picture in decoding order.

Scalable video coding is a desirable feature for many multimedia applications and services used in systems employing decoders with a wide range of processing power. Several types of video scalability schemes have been proposed, such as temporal, spatial and quality scalability. These proposed types consist of a base layer and an enhancement layer. The base layer is the minimum amount of data required to decode the video stream, while the enhancement layer is the additional data required to provide an enhanced video signal.

The working draft of the scalable extension to H.264/AVC currently enables coding of multiple scalable layers. The working draft is described in JVT-N020, "Scalable video coding—working draft 1," 14th meeting, Hong Kong, January 2005, and is also known as MPEG document w6901, "Working Draft 1.0 of 14496-10:200x/AMD1 Scalable Video Coding," Hong Kong meeting, January 2005. In this coding of multiple scalable layers, the variable DependencyID signaled in the bitstream is used to indicate the coding dependencies of different scalable layers. A coded picture with a certain value of DependencyID can only use reference pictures with the same value of DependencyID for motion compensated inter prediction. The syntax element frame_num is coded in the slice header, and is used to identify reference pictures that are used for inter prediction reference. Basically, the frame_num increases by 1 relative to the value of the frame_num in the previous reference picture in decoding order.

By way of example of the frame_num coding method, FIG. 1 illustrates decoding and dependency relationships between pictures in an enhanced video signal having pictures 13, 15, 17, 19, 21, and 23. The number after the picture type (i.e., IDR, E-IDR, P or E-P) denotes the decoding order of the pictures. The picture type preceded with "E-" means that the picture is an enhancement layer picture. Pictures 13, 15, and 17 in FIG. 1 are enhancement layer pictures. The picture order count (POC) refers to the temporal relationship between pictures. Arrows indicate the decoding dependency relationship between pictures. Using the frame_num coding method, the decoding order of pictures 13, 15, 17, 19, 21, and 23 is picture 19, picture 13, picture 21, picture 15, picture 23, and picture 17.

This frame_num coding method has several problems. For example, if one or more enhancement layers are not required for a certain scalable presentation, and those enhancement layers contain reference pictures, then even if the transmission is error-free, there will be gaps in the value of frame_num. As such, reference picture loss detection based on gaps in frame_num becomes impossible. If only the base layer is needed in FIG. 1, then the frame_num values in successive pictures will be 0, 2, 4, . . . such that frame_num gaps exist when no loss happens.

Another problem with this coding method is that memory management control operations (MMCOs), including reference picture marking process and reference picture list reordering process, may be used to manage the coded picture buffer. In those operation processes, the information of the target reference picture under the operation is signaled. With the current frame_num coding, signaling of the said information becomes less efficient. For example, in FIG. 1 the reference picture list is 10, 8, 6, 4, 2, 0 (Pic Num).

In FIG. 1, even if enhancement pictures, such as pictures 13, 15, and 17 are not required for the decoding and presentation of the video, the value of frame_num still increases for the enhancement picture. For example, the value of frame_num for picture 19 is 0, the value of frame_num for picture 13 (which is an enhancement picture) is 1, and the value of frame_num for picture 21 is 2. Thus, the frame_num increases from 0 to 1 from picture 19 to picture 13, even if the picture 13 (an enhancement picture) is not needed.

Conventional methodologies have not solved some of the problems associated with the coding method utilizing frame_num. For example, one technique uses the picture number Supplemental Enhancement Information (SEI) message in H.263 Annex W, in which the picture number is increased by 1, in a modulo operation, whenever a picture is encoded, regardless of whether the picture belongs to the base layer or an enhancement layer. This coding of picture number is actually the same way as the coding of frame_num in the working draft 1.0 of the scalable extension to H.264/AVC. Another technique uses the sub-sequence information SEI message in H.264/AVC Annex D, in which there is a sub_seq_frame_num that is 0 for the first picture of the sub-sequence and incremented by 1 in a modulo operation, relative to the previous reference picture, in decoding order, that belongs to the sub-sequence. This coding of sub_seq_frame_num is independent for reference pictures in a any sub-sequence, which belongs to a certain sub-sequence layer (i.e., a temporal scalable layer in the context of the working draft 1.0 of the scalable extension to H.264/AVC).

Thus, there is a need to avoid gaps in the value of frame_num when one or more enhancement layers containing reference pictures are not required. Further, there is a need to signal information associated with the target reference picture in a more efficient manner. Even further, there is a need to better manage the coded picture buffer by marking and reordering reference pictures. Still further, there is a need to decode and present reference pictures in a smooth and efficient manner such that reference picture loss can be efficiently detected and the decoder can decide whether to continue decoding or rather take proper action to handle the loss, e.g. request an intra update from the encoder side.

SUMMARY OF THE INVENTION

In general, the present invention relates to scalable video coding and techniques for ensuring reference picture loss detection. In the present invention, for all pictures with a certain value of DependencyID, the syntax element frame_num is coded independently of other pictures with different values of DependencyID. Within all pictures with a pre-determined value of DependencyID, a default frame_num coding method is used. This technique can improve coding efficiency of memory management control operation (MMCO) signaling.

One exemplary embodiment relates to a method of encoding scalable video data having multiple layers where each layer in the multiple layers is associated with at least one other layer. This method can include identifying one or more layers using a first identifier where the first identifier indicates decoding dependency, and identifying reference pictures within the identified one or more layers using a second identifier. The coding of the second identifier for pictures in a first layer is independent of pictures in a second layer.

Another exemplary embodiment relates to a module that codes scalable video data having multiple layers where each layer in the multiple layers is associated with at least one other layer. This module can include a means for coding a first identifier for all pictures in a first layer with a certain second identifier. The coding of the second identifier for pictures in a first layer is independent of pictures in a second layer.

Another exemplary embodiment relates to a computer program product utilized in scalable video coding. This computer program product includes computer code configured to identify one or more layers using a first identifier, where the first identifier indicates decoding dependency; and identify reference pictures within the identified one or more layers using a second identifier. The coding of the second identifier for pictures in a first layer is independent of pictures in a second layer.

DETAILED DESCRIPTION OF EXEMPLARY EMBODIMENTS

Exemplary embodiments present methods, computer code products, and devices for improved scalable video coding. Embodiments can be used to solve some of the problems inherent to existing solutions. For example, these embodiments can be used to improve the coding and presentation of reference pictures in a smooth and efficient manner such that reference picture loss can be efficiently detected and the decoder can decide whether to continue decoding or rather take proper action to handle the loss, e.g. request an intra update from the encoder side. Further, the embodiments can signal information associated with the target reference picture in a more efficient manner in reference picture management processes.

As used herein, the term "enhancement layer" refers to a layer that is coded differentially compared to some lower quality reconstruction. The purpose of the enhancement layer is that, when added to the lower quality reconstruction, signal quality should improve, or be "enhanced." Further, the term "base layer" applies to both a non-scalable base layer encoded using an existing video coding algorithm, and to a reconstructed enhancement layer relative to which a subsequent enhancement layer is coded.

As noted above, embodiments include program products comprising computer-readable media for carrying or having computer-executable instructions or data structures stored thereon. Such computer-readable media can be any available media that can be accessed by a general purpose or special purpose computer. By way of example, such computer-readable media can comprise RAM, ROM, EPROM, EEPROM, CD-ROM or other optical disk storage, magnetic disk storage or other magnetic storage devices, or any other medium which can be used to carry or store desired program code in the form of computer-executable instructions or data structures and which can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above are also to be included within the scope of computer-readable media. Computer-executable instructions comprise, for example, instructions and data which cause a general purpose computer, special purpose computer, or special purpose processing device to perform a certain function or group of functions. Any common programming language, such as C or C++, or assembly language, can be used to implement the invention.

Figure 1:
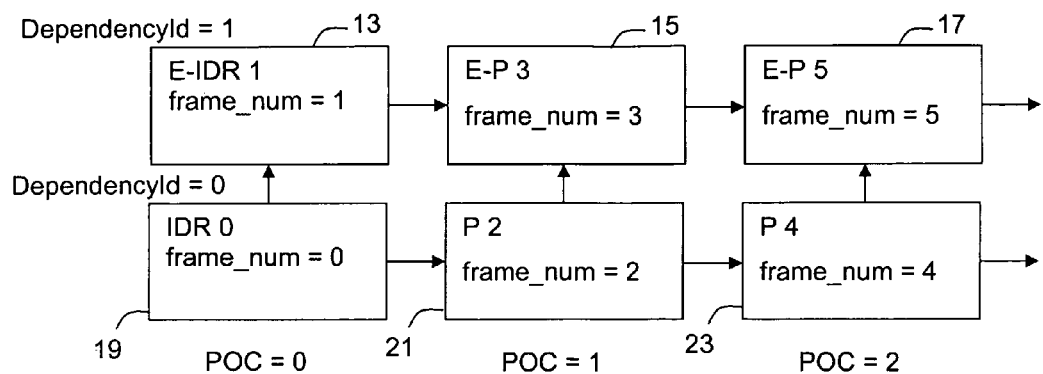
FIG. 1 is a diagram depicting decoding and dependency relationships between pictures in an enhanced video signal having pictures in accordance with conventional techniques.
Figure 2:
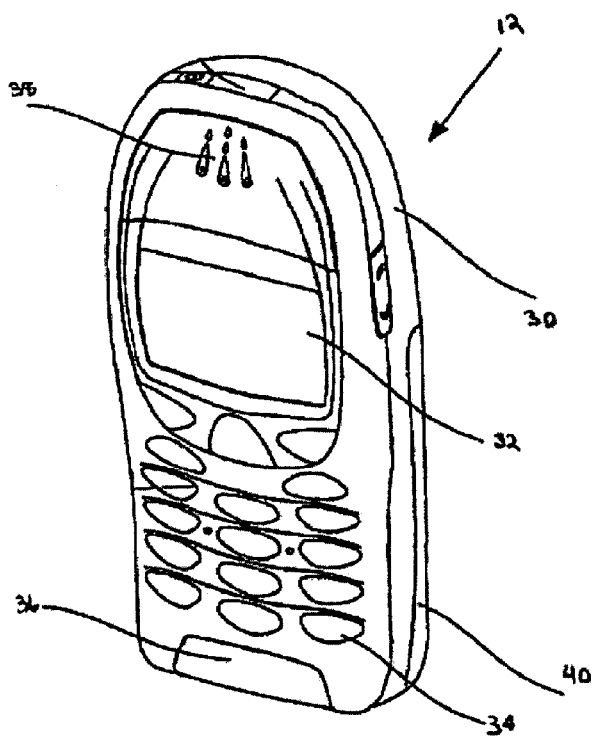
FIG. 2 is a perspective view of a communication device that can be used in an exemplary embodiment.
Figure 3:
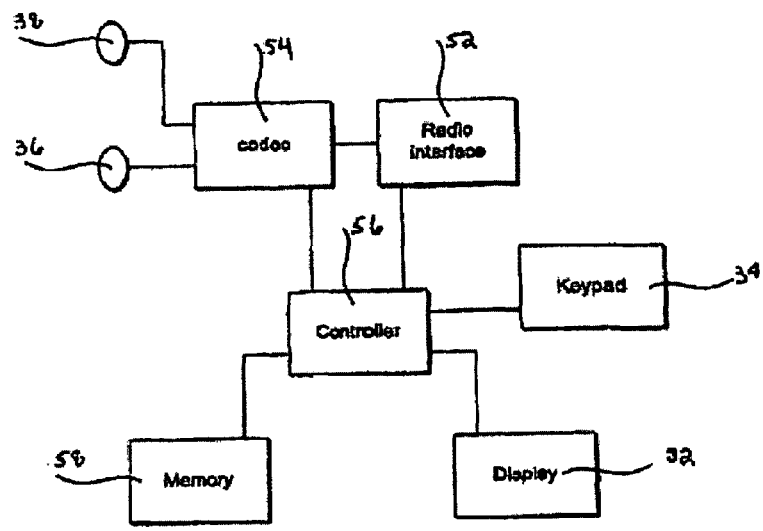
FIG. 3 is a block diagram illustrating an exemplary functional embodiment of the communication device of FIG. 2.

FIGS. 2 and 3 show an example implementation as part of a communication device (such as a mobile communication device like a cellular telephone, or a network device like a base station, router, repeater, etc.). However, it is important to note that the present invention is not limited to any type of electronic device and could be incorporated into devices such as personal digital assistants, personal computers, mobile telephones, and other devices. It should be understood that the present invention could be incorporated on a wide variety of devices.

The device 12 of FIGS. 2 and 3 includes a housing 30, a display 32, a keypad 34, a microphone 36, an ear-piece 38, a battery 40, radio interface circuitry 52, codec circuitry 54, a controller 56 and a memory 58. Individual circuits and elements are all of a type well known in the art, for example in the Nokia range of mobile telephones. The exact architecture of device 12 is not important. Different and additional components of device 12 may be incorporated into the device 12. The scalable video encoding and decoding techniques of the present invention could be performed in the controller 56 memory 58 of the device 12.

The exemplary embodiments are described in the general context of method steps or operations, which may be implemented in one embodiment by a program product including computer-executable instructions, such as program code, executed by computers in networked environments. Generally, program modules include routines, programs, objects, components, data structures, etc. that perform particular tasks or implement particular abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps.

Software and web implementations could be accomplished with standard programming techniques with rule based logic and other logic to accomplish the various database searching steps, correlation steps, comparison steps and decision steps. It should also be noted that the words "module" as used herein and in the claims is intended to encompass implementations using one or more lines of software code, and/or hardware implementations, and/or equipment for receiving manual inputs.

Figure 4:
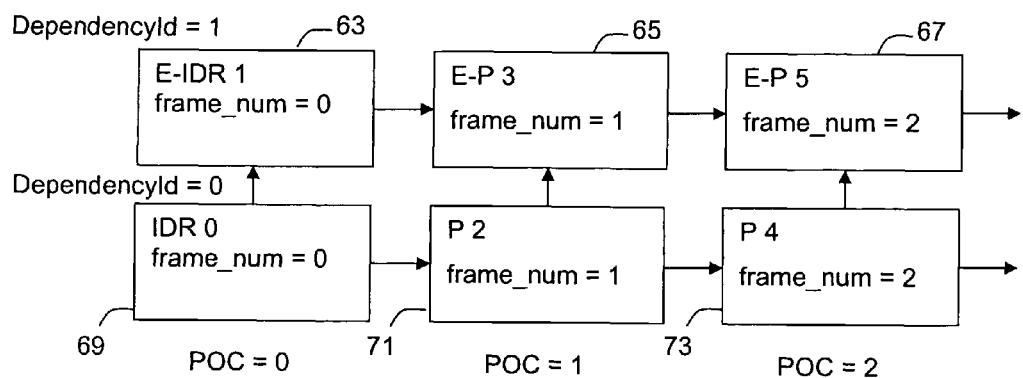
FIG. 4 is a diagram depicting decoding and dependency relationships between pictures in an enhanced video signal having pictures in accordance with an exemplary embodiment.

FIG. 4 illustrates decoding and dependency relationships between pictures 63, 65, 67, 69, 71, and 73 in a video signal. The number after the picture type (i.e., IDR, E-IDR, P or E-P) denotes the decoding order of the pictures. The picture type preceded with "E-" means that the picture is an enhancement layer picture. For example, pictures 63, 65, and 67 in FIG. 4 are enhancement layer pictures. The picture order count (POC) refers to the temporal relationship between pictures. Arrows indicate the decoding dependency relationship between pictures.

Video bitstreams in scalable video include a DedpendencyID which designates a scalable layer. In accordance with an exemplary methodology, the value of frame_num for one layer is independent of the frame_num for a second layer. For example, referring to FIG. 4 the value of frame_num for picture 69—which has a DependencyID of 0—is 0 and the value of frame_num for picture 63—which has a DependencyID of 1—is also 0. In FIG. 4, the decoding order of pictures 63, 65, 67, 69, 71, and 73 can be picture 69, picture 71, and picture 73, if pictures 63, 65, and 67 are not required for decoding and presentation. If one or more of the enhancement pictures are required, they are included in the order. For example, where pictures 63, 65 and 67 are required, the ordering would be picture 69, picture 63, picture 71, picture 65, picture 73, and picture 67.

Coding the frame number independently for all pictures with the same DependencyID value ensures reference picture loss detection based on frame_num value gaps and enables efficient signalling of MMCO information.

Figure 5:
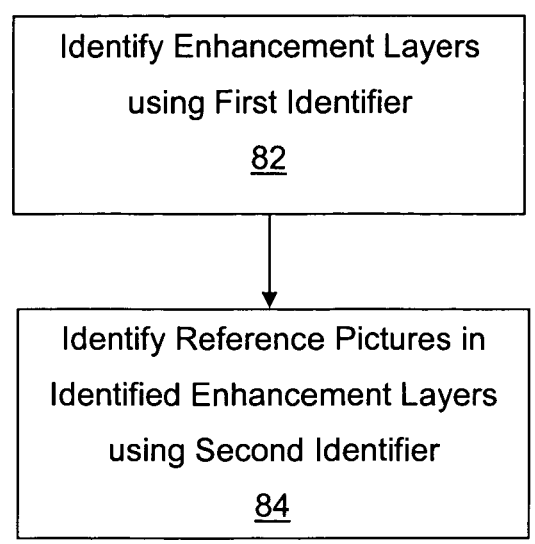
FIG. 5 is a flow diagram of operations performed in the coding of a frame number in scalable video coding in accordance with an exemplary embodiment.

FIG. 5 illustrates operations performed in the coding of a frame number in scalable video coding. Additional, fewer, or different operations may be performed depending on the embodiment or implementation. The scalable video data has multiple layers where each layer is associated with at least one other layer. In an operation 82, one or more layers are identified using a first identifier. This first identifier indicates decoding dependency. The one or more layers can be spatial, quality, or FGS enhancement layers.

In an operation 84, a second identifier is used to identify reference pictures within an identified layer. This second identifier is separate from and part of a separate sequence of numbers than the first identifier. The coding of the second identifier for all pictures in the layer with a first value of the first identifier is independent of all pictures in an layer with a second value of the first identifier.

Advantages of the methodology described include that reference picture loss detection based on frame_num value gaps is ensured. If there is no reference picture loss in the base layer or an enhancement layer (but not the highest enhancement layer), the decoding and presentation can be continued smoothly; otherwise, considerable quality degradation is likely to happen. Knowing this information, the decoder can act properly to maximize the end user experience. For example, if the decoder knows that there is no reference picture loss, it can just continue decoding. In FIG. 5, for any layer, the frame_num values in successive pictures are 0, 1, 2, . . . such that no frame_num gap exists when no loss happens.

For another example, if the decoder knows that there is reference picture loss, it may evaluate the quality degradation, and if the quality degradation is likely big, it may stop displaying and request an update of the video content from the sending side. Further, the methodology provides that signaling of MMCO information becomes more efficient such that coding efficiency is improved. In FIG. 5, for a picture of any layer, the reference picture list is 5, 4, 3, 2, 1, 0 (Pic Num).

While several embodiments of the invention have been described, it is to be understood that modifications and changes will occur to those skilled in the art to which the invention pertains. Accordingly, the claims appended to this specification are intended to define the invention precisely.

The invention claimed is:

1. A method of coding scalable video data having at least a first and a second layer, said layers comprising one or more of a spatial, quality, and fine granularity scalability (FGS) enhancement layer and said first and second layers together comprising at least two pictures, the method comprising:
    identifying the first layer using a first value of a dependency identifier and the second layer using a second value of the dependency identifier, the dependency identifier indicating decoding dependency such that for a coded picture with a certain value of dependency identifier only reference pictures with the same value of the dependency identifier are usable for motion compensated inter prediction;
    identifying said reference pictures within the identified first and second layers using a second identifier; and
    coding a value of the second identifier for pictures in the first and the second layer, wherein said value is increased by one relative to the value of the second identifier of a previous reference picture in decoding order in each of said first and second layer.

2. The method of claim 1, wherein the dependency identifier comprises a DependencyID variable.

3. The method of claim 1, wherein a default dependency identifier is used as the dependency identifier.

4. The method of claim 1, wherein the second identifier comprises a frame_num syntax element.

5. The method of claim 1, wherein any one of the second identifier and a third identifier derived from the second identifier is utilized in memory management control operation (MMCO) signaling.

6. The method of claim 5, wherein the third identifier comprises a variable PicNum.

7. The method of claim 5, wherein the memory management control operation (MMCO) is a reference picture list reordering process.

8. The method of claim 5, wherein the memory management control operation (MMCO) is a reference picture marking process.

9. An apparatus configured to code scalable video data having at least a first and a second layer, said layers comprising one or more of a spatial, quality, and fine granularity scalability (FGS) enhancement layer and said first and second layers together comprising at least two pictures, the apparatus comprising:
    a controller, a memory, and computer-executable program modules stored in the memory, the controller being configured to:
    identify the first layer using a first value of a dependency identifier and the second layer using a second value of the dependency identifier, the dependency identifier indicating decoding dependency such that for a coded picture with a certain value of dependency identifier only reference pictures with the same value of the dependency identifier are usable for motion compensated inter prediction;
    identify said reference pictures within the identified first and second layers using a second identifier; and
    code a value of the second identifier for pictures in the first and the second layer, wherein said value is increased by one relative to the value of the second identifier of a previous reference picture in decoding order in each of said first and second layer.

10. The apparatus of claim 9, wherein the dependency identifier comprises a DependencyID variable.

11. The apparatus of claim 9, wherein a default dependency identifier is used as the dependency identifier.

12. The apparatus of claim 9, wherein the second identifier comprises a frame_num syntax element.

13. The apparatus of claim 9, wherein any one of the second identifier and a third identifier derived from the second identifier is utilized in memory management control operation (MMCO) signaling.

14. The apparatus of claim 13, wherein the third identifier comprises a variable PicNum.

15. The apparatus of claim 13, wherein the memory management control operation (MMCO) is a reference picture list reordering process.

16. The apparatus of claim 13, wherein the memory management control operation (MMCO) is a reference picture marking process.

17. A computer program product for coding scalable video data having at least a first and a second layer, said layers comprising one or more of a spatial, quality, and fine granularity scalability (FGS) enhancement layer and said first and second layers together comprising at least two pictures, the computer program product comprising a non-transitory computer readable medium having program code portions stored thereon, the program code portions being configured, when said computer program product is run on a processor with a memory, to:
    identify the first layer using a first value of a dependency identifier and the second layer using a second value of the dependency identifier, the dependency identifier indicating decoding dependency such that for a coded picture with a certain value of dependency identifier only reference pictures with the same value of the dependency identifier are usable for motion compensated inter prediction; and
    identify said reference pictures within the identified first and second layers using a second identifier; and
    code a value of the second identifier for pictures in the first and the second layer, wherein said value is increased by one relative to the value of the second identifier of a previous reference picture in decoding order in each of said first and second layer.

18. The computer program product of claim 17, wherein the dependency identifier comprises a DependencyID variable.

19. The computer program product of claim 17, wherein a default dependency identifier is used as the dependency identifier.

20. The computer program product of claim 17, wherein the second identifier comprises a frame_num syntax element.

21. The computer program product of claim 17, wherein any one of the second identifier and a third identifier derived from the second identifier is utilized in memory management control operation (MMCO) signaling.

22. The computer program product of claim 21, wherein the third identifier comprises a variable PicNum.

23. The computer program product of claim 21, wherein the memory management control operation (MMCO) is a reference picture list reordering process.

24. The computer program product of claim 21, wherein the memory (management control operation MMCO) is a reference picture marking process.

* * * * *